United States Patent
Butz et al.

(10) Patent No.: US 11,484,110 B2
(45) Date of Patent: Nov. 1, 2022

(54) INTERDENTAL CLEANER

(71) Applicant: Sunstar Suisse SA, Etoy (CH)

(72) Inventors: Jürgen Butz, Schönau (DE); Gerhard Pötsch, Freiburg (DE)

(73) Assignee: Sunstar Suisse SA, Etoy (CH)

( * ) Notice: Subject to any disclaimer, the term of this patent is extended or adjusted under 35 U.S.C. 154(b) by 353 days.

(21) Appl. No.: 16/760,076

(22) PCT Filed: Oct. 24, 2018

(86) PCT No.: PCT/EP2018/000485
§ 371 (c)(1),
(2) Date: Apr. 29, 2020

(87) PCT Pub. No.: WO2019/096434
PCT Pub. Date: May 23, 2019

(65) Prior Publication Data
US 2021/0120944 A1    Apr. 29, 2021

(30) Foreign Application Priority Data
Nov. 15, 2017   (DE) ..................... 10 2017 010 561.8

(51) Int. Cl.
*A61C 15/02*     (2006.01)
*A46B 3/00*      (2006.01)
(Continued)

(52) U.S. Cl.
CPC .............. *A46B 3/005* (2013.01); *A46B 17/04* (2013.01); *A61C 15/00* (2013.01); *A61C 15/02* (2013.01); *A46B 2200/108* (2013.01)

(58) Field of Classification Search
CPC ......... A61C 15/02; A61C 15/00; A46B 17/04; A46B 3/00; A46B 3/05
See application file for complete search history.

(56) References Cited

U.S. PATENT DOCUMENTS 4,683,875 A * 8/1987 Rabinowitz ............ A61H 13/00
                                                          601/141
5,775,346 A   7/1998 Szyszkowski
(Continued)

FOREIGN PATENT DOCUMENTS

DE          19642431 A1   4/1998
DE      102011101391 A1   11/2012
(Continued)

OTHER PUBLICATIONS

International Search Report with English translation corresponding to International Application No. PCT/EP2018/000485, dated Jan. 25, 2019 (8 pages).
(Continued)

*Primary Examiner* — Shay Karls
(74) *Attorney, Agent, or Firm* — Flynn Thiel, P.C.

(57) ABSTRACT

An interdental cleaner (10) has a rod-shaped support (11) made of plastic, a handle part (12) connected to the support (11), and a cleaning part (13) which has a sleeve-shaped cover (14) arranged on the support (11). The cover carries radially outwardly protruding cleaning elements (15). Provision is made that the cover consists of a plurality of cover parts, wherein a first cover part (16) consists of a first soft-elastic plastic, and wherein a second cover part (17) consists of a second soft-elastic plastic or of a thermoplastic, wherein the plastics material of the first cover part (16) is different than the plastics material of the second cover part (17). Preferably, the plastics material of the first cover part (16) has a lower Shore hardness than the plastics material of the second cover part (17).

16 Claims, 5 Drawing Sheets

(51) Int. Cl.
 A46B 17/04 (2006.01)
 A61C 15/00 (2006.01)

(56) References Cited

U.S. PATENT DOCUMENTS

| | | |
|---|---|---|
| 6,158,444 A | 12/2000 | Weihrauch |
| 2011/0041271 A1 | 2/2011 | Huang |
| 2015/0282601 A1 | 10/2015 | Butz et al. |
| 2015/0335141 A1 | 11/2015 | Schär et al. |
| 2017/0216002 A1 | 8/2017 | Butz |
| 2019/0125506 A1 | 5/2019 | Butz |

FOREIGN PATENT DOCUMENTS

| | | | |
|---|---|---|---|
| DE | 102012015663 A1 | 5/2014 | |
| DE | 102014011405 A1 | 2/2016 | |
| DE | 102016005012 A1 | 10/2017 | |
| WO | 2014/005659 A1 | 1/2014 | |
| WO | 2014/023424 A1 | 2/2014 | |
| WO | WO-2019131643 A1 * | 7/2019 | ............. A61C 15/02 |

OTHER PUBLICATIONS

Written Opinion of International Searching Authority corresponding to International Application No. PCT/EP2018/000485, dated Jan. 25, 2019 (5 pages).
German Search Report corresponding to German Application No. 10 2017 010 561.8, dated Sep. 14, 2018 (6 pages).

* cited by examiner fig.3 fig.4 fig.5

INTERDENTAL CLEANER

The invention relates to an interdental cleaner comprising a rod-shaped support made of plastics material, a handle part connected to the support, and a cleaning part, which has a sleeve-shaped cover arranged on the support, the cover supporting radially outwardly protruding cleaning elements.

An interdental cleaner of the above-mentioned construction has a rod-shaped support made of a dimensionally stable plastics material, which is provided at one end with a handle part that is planar, for example. The handle part can be integrally molded or retrofitted to the support.

A sleeve-shaped cover made of a soft-elastic plastics material, for example a thermoplastic elastomer, is arranged and in particular overmolded in the front end region of the rod-shaped support remote from the handle part. The cover supports radially outwardly protruding cleaning elements, which may be integrally molded, radially projecting fingers and/or embedded, prefabricated bristles of a monofilament.

In the present description, the term "axial" refers to the longitudinal axis of the rod-shaped support and the interdental cleaner and the term "radial" describes a direction that extends perpendicularly to the longitudinal axis of the rod-shaped support. The handle part is located at the rear end of the support and the cleaning part or the cover are arranged at the front end of the support.

To clean the interdental spaces, a user grips the interdental cleaner by the handle portion and introduces the opposite front end or the cleaning part comprising the coating into the interdental spaces, the protruding cleaning elements cleaning the interdental spaces. The material of the cover must meet different requirements. On the one hand, the material of the cover must be soft enough to prevent damage or injury to the gums if the interdental cleaner is inserted incorrectly or inaccurately into an interdental space. For this reason, the cover should be as soft as possible.

On the other hand, it is necessary that the cover also reliably removes food stuck in the interdental spaces. For this purpose, the cover should be relatively hard. It has been shown that it is difficult to adapt the cover to these different requirements while at the same time avoiding injuries to the gums and ensuring a good cleaning effect.

The problem addressed by the invention is to provide an interdental cleaner of the above-mentioned type in which both an injury to the gums can be prevented and good cleaning of the interdental spaces can be achieved.

This problem is solved according to the invention by an interdental cleaner. It is provided that the cover comprises a plurality of cover parts made of different materials. A first cover part comprises a first soft-elastic plastics material and a second cover part comprises a second soft-elastic plastics material or a thermoplastic material. The plastics material of the first cover part is different from the plastics material of the second cover part. Because there is a plurality of cover parts made of different plastics materials, it is possible to adapt the materials to the intended use. For example, it may be provided that a very soft plastics material and in particular a thermoplastic elastomer or a silicone is arranged in the front end region of the support, i.e. at the front end of the interdental cleaner with which it is inserted into an interdental space. In this way, the risk of injury to the gums is reduced if the interdental cleaner is incorrectly inserted into the interdental space.

Preferably, in another region, which is axially spaced from the front end of the support, a somewhat harder plastics material is used, which ensures that the interdental space is also cleaned of coarse, stuck food once the interdental cleaner has been properly inserted into the interdental space.

In a possible embodiment, it may be provided that both the material of the first cover part and the material of the second cover part are a soft-elastic plastics material and in particular a thermoplastic elastomer or silicone. It is preferably provided that the plastics material of the first cover part and the plastics material of the second cover part have different Shore hardnesses, the plastics material of the first cover part preferably having a lower Shore hardness than the plastics material of the second cover part.

If the second cover part is made of a thermoplastics material, the softness and flexibility of the protruding cleaning elements, in particular the molded fingers, results less from the properties of the material than from the shape of the fingers. The fingers are preferably relatively thin, i.e. with a diameter in the range of from 0.02 mm to 0.2 mm and in particular in the range of from 0.07 mm to 0.15 mm, and have a diameter of 0.1 mm, for example. Due to the delicate design of the fingers of the second cover part, it is possible to arrange a much larger number of cleaning elements or fingers and to arrange the cleaning elements or fingers much more densely compared with the first cover part.

The support preferably consists of a plastics material which is different from the soft-elastic plastics materials of the first cover part and the second cover part. The interdental cleaner thus consists of at least three plastics components, which are preferably injected one after the other in a multi-component injection-molding process. Alternatively, it is possible to form the support in a first step and, in a subsequent second step, to overmold the plastics materials to form the first cover part and the second cover part at the same time.

The first cover part and the second cover part may abut one another directly, but in a preferred embodiment of the invention, it is provided that a groove is formed at least in portions between the first cover part and the second cover part. An additive, for example a dye or a flavoring or a medical active substance, for example a disinfectant, can be introduced into the groove.

The groove or grooves can form additional cleaning surfaces for the teeth or interdental spaces due to their radially outer groove edges. To achieve this, in a development of the invention, it may be provided that the groove has a width in the range of from 0.05 mm to 1.0 mm and in particular in the range of from 0.1 mm to 0.5 mm on its radially outer opening.

The depth of the groove preferably extends down to the support, i.e. the surface of the support forms the bottom of the groove.

In a first possible embodiment of the invention, it is provided that the first cover part is arranged in the front end region of the support and that the second cover part is arranged so as to be axially offset, relative thereto, on the support in the direction of the handle part. In this case, the first cover part may be a tubular sleeve which may be closed at its front end, i.e. in the region of the front tip of the support. The second cover part may be designed as a tubular sleeve which sits on and surrounds the support. The groove formed between the first cover part and the second cover part preferably extends over the entire circumference of the support.

In another embodiment of the invention, it may be provided that the first cover part and the second cover part are not designed as a sleeve that completely surrounds the support, but only as a partial shell or half shell, i.e. as a half tube or a half sleeve. The partial shell or half shell surrounds the support only over part of its circumference, it being possible for the two cover parts in cooperation to completely encompass the support except for the groove possibly formed therebetween.

In a preferred embodiment of the invention, it may be provided that the first cover part covers a longitudinal side of the axial length of the front portion of the support, while the second cover part covers a diametrically opposite longitudinal side of the axial length of the front portion of the support. The two cover parts thus interact to form a sleeve-shaped cover.

A groove extending in the longitudinal direction of the support may be formed between the two cover parts. The groove may extend in a straight line or in the form of a serpentine line.

In a possible embodiment of the invention, it may be provided that the groove is filled by a rib formed on the support, as a result of which the interdental cleaner is given greater strength.

In said embodiment, the first cover part is on a longitudinal side of the axial length of the front portion of the support, for example on the right-hand side of the front portion of the support, while the second cover part rests on the diametrically opposite longitudinal side, for example on the left-hand side of the support. For this purpose, the cover parts may be designed as a straight half shell or partial shell.

In an alternative embodiment of the invention, it may be provided that each cover part consists of two partial-shell or half-shell portions which are offset from one another by 180° about the longitudinal axis. It may be provided here that the first cover part in the front end region of the support covers a longitudinal side of the support and, in a region axially offset from the front end region in the direction of the handle part, covers the diametrically opposite longitudinal side of the support. For example, the first cover part in the front end region of the support may cover the right-hand longitudinal side thereof and may cover the left-hand longitudinal side thereof in a portion of the support axially offset therefrom in the direction of the handle. Accordingly, the second cover part may cover each of the longitudinal sides of the support diametrically opposite the first cover part.

In another alternative embodiment of the invention, it may be provided that the first cover part and the second cover part are each designed as a helix extending around the support. It may be provided here that the two cover parts are combined so as to be offset by half a pitch of the helices. In this way, the two helices form a sleeve-shaped cover of the support. The two helices have the same pitch, such that the spaces between one helix are either completely or at least predominantly filled by the other helix. If there is an axial distance between the two helices, a helically circumferential groove is formed, which can be filled with an additive in the above-mentioned manner. The radially outer groove edges form additional contact surfaces for the teeth or gums, such that there is increased cleaning performance.

In another alternative embodiment of the invention, it may be provided that the cleaning part comprises a plurality of cleaning-part portions that lie in the axial direction of the support or rest against one another, it preferably being provided that a first cleaning-part portion is formed solely by the first cover part, a second cleaning-part portion is formed by the first cover part and the second cover part and a third cleaning-part portion is formed solely by the second cover part. It may be provided that the first cover part has a sleeve-like cap, which covers the front end region of the support, and a region molded thereon which is designed as a helix extending around the support. The second cover part may have a tubular sleeve and a portion molded thereon which is designed as a helix extending around the support. The two coils may be offset from one another by half a pitch, such that the second cleaning-part portion is formed by the two helices of the two cover parts. In this way, three consecutive cleaning-part portions are formed along the support, which each have a different cleaning effect. The front first cleaning portion, which is formed solely by the first cover part, is designed to be relatively soft. The second cleaning-part portion which follows in the direction of the handle part represents a combination of the two helices of the first cover part and the second cover part, while the subsequent third cleaning portion results solely from the second cover part. From a functional point of view, there is a graduated transition between the above-mentioned cleaning portions in terms of softness and rigidity.

Further details and features of the invention will become apparent from the following description of embodiments with reference to the drawings, in which.

Figures 1, 2:
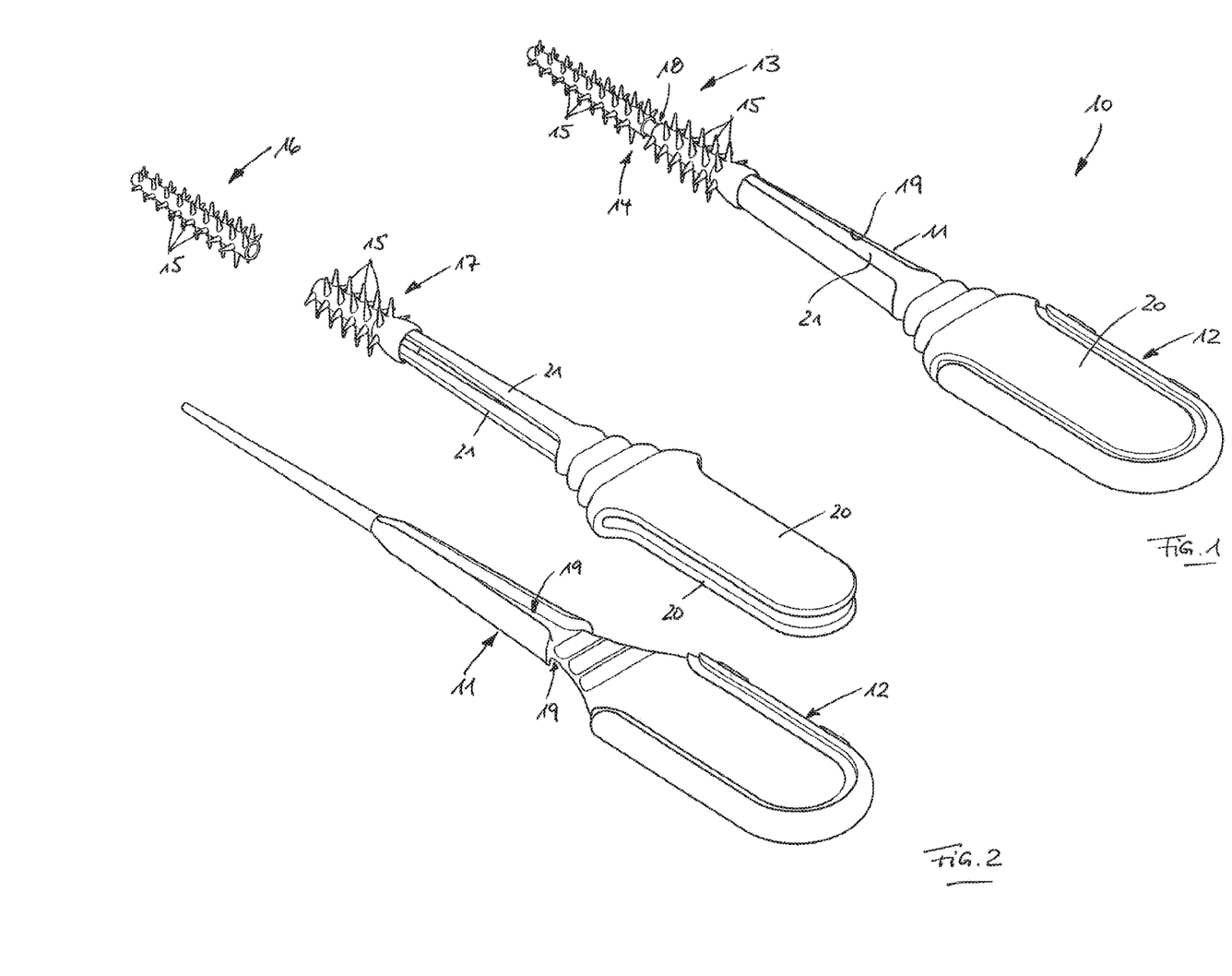
FIG. 1 is a perspective plan view of an interdental cleaner according to a first embodiment of the invention.
FIG. 2 is an exploded view of the components of the interdental cleaner according to FIG. 1.

FIG. 1 is a perspective view of an interdental cleaner 10, which has a rod-shaped support 11 made of a dimensionally stable plastics material, on which a planar handle part 12 is integrally molded at the rear end.

A cleaning part 13 is attached to the support 11 at the opposite front end. The cleaning part 13 has a sleeve-shaped cover 14, which is constructed in two parts and consists of a first front cover part 16 and a second rear cover part 17. The first cover part 16 is designed as a sleeve, which is closed at its front end, and supports, on its outer face, a plurality of radially protruding cleaning elements 15 in the form of integrally formed fingers. The first cover part 16 consists of a first soft-elastic plastics material, for example a thermoplastic elastomer.

The second cover part 17 is designed as a tubular sleeve and consists of a second soft-elastic plastics material, for example a thermoplastic elastomer. It also supports radially outwardly protruding cleaning elements 15 on its outer face in the form of integrally molded fingers.

As shown in FIG. 2 in particular, in its central portion between the handle part 12 and the cleaning part 13, the rod-shaped support 11 has two channels 19 which extend in the longitudinal direction of the support and are filled with the second soft-elastic plastics material. The handle part 12 is provided on either side with a layer 20 made of the second soft-elastic plastics material, which is connected to the second cover part 17 via connecting webs 21 which are arranged in the channels 19. In this way, the second cover part 17, the connecting webs 21 and the supports 20 are formed as an integral plastics part.

The first front cover part 16 and the second cover part 17 therebehind are arranged with an axial offset, such that a circumferential groove 18 is formed between the two cover parts 16 and 17. This groove 18 can be filled with an additive, for example a flavoring or a medical active substance.

The first soft-elastic plastics material of the first cover part 16 and the second soft-elastic plastics material of the second cover part 17 have different Shore hardnesses, the first soft-elastic plastics material having a lower Shore hardness than the second soft-elastic plastics material.

Figure 3:
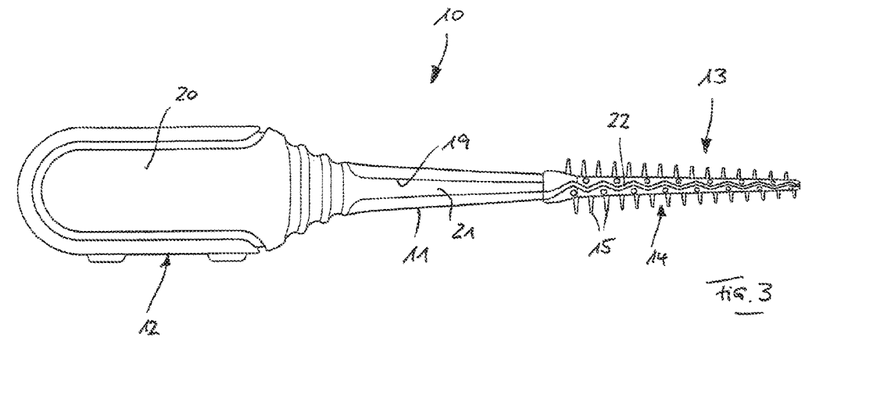
FIG. 3 is a plan view of an interdental cleaner according to a second embodiment of the invention.
Figures 4, 5:
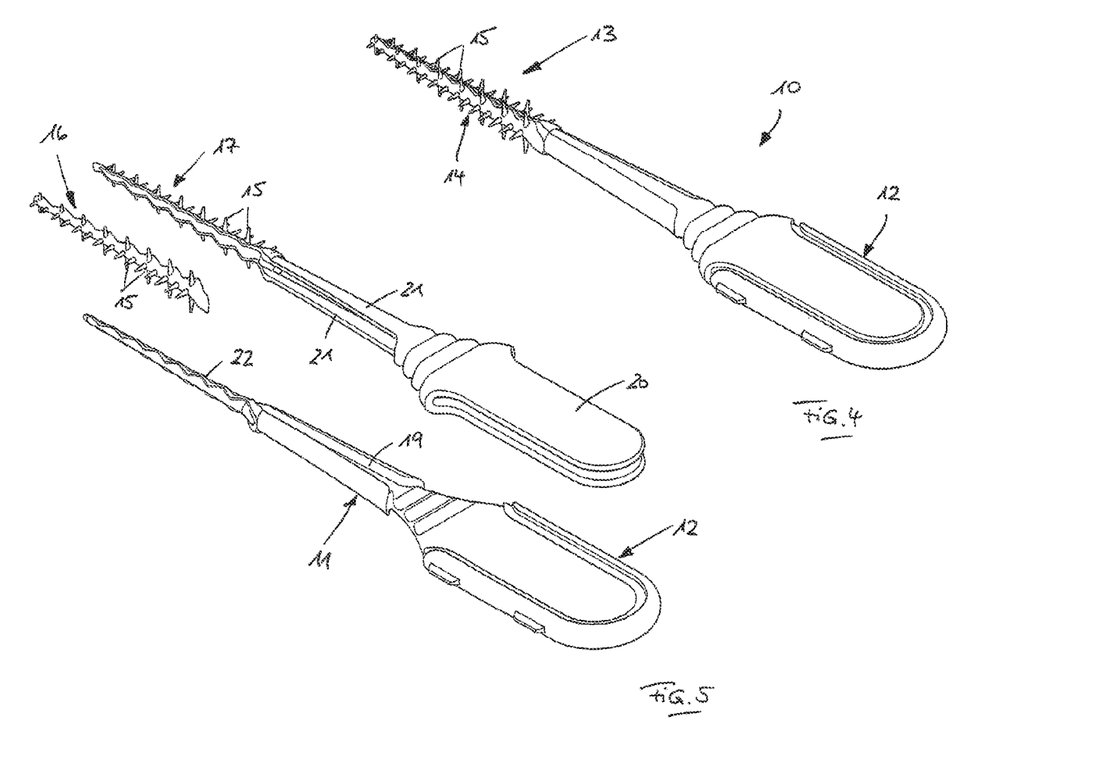
FIG. 4 is a perspective view of the interdental cleaner according to FIG. 3.
FIG. 5 is an exploded view of the components of the interdental cleaner according to FIG. 4.

FIGS. 3 to 5 show an alternative embodiment of the interdental cleaner 10, which differs from the above-mentioned embodiment of the interdental cleaner 10 only in the design and arrangement of the two cover parts 16 and 17. As FIG. 5 in particular shows, the first cover part 16 and the second cover part 17 are each designed as a partial shell or half shell extending in the longitudinal direction of the support 11 in the form of a half tube or a half sleeve divided in the longitudinal direction. The first cover part 16 covers a longitudinal side of the axial length of the front portion of the support 11 (the left-hand longitudinal side according to FIG. 4), while the second cover part covers a diametrically opposite (according to FIG. 4) longitudinal side of the axial length of the front portion of the support 11. In cooperation, the two cover parts 16 and 17 form the sleeve-shaped cover 14, with a partition wall 22 being provided between the two cover parts 16 and 17, which is integrally formed on the support 11 and extends in a serpentine line along the support 11 as far as the front end thereof.

Figure 6:
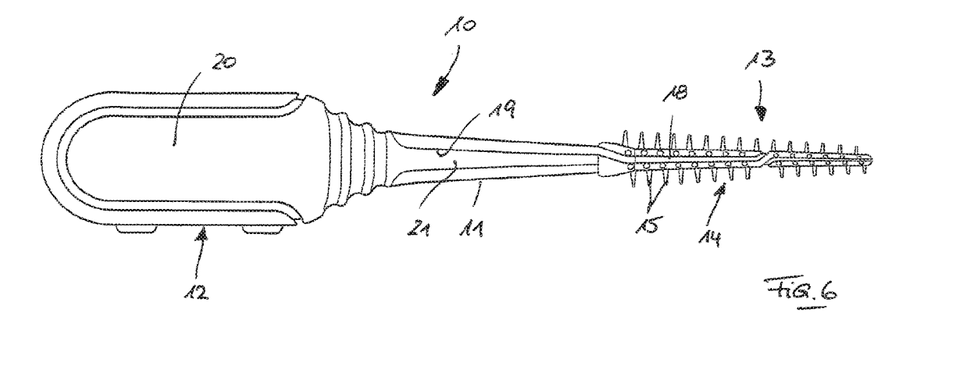
FIG. 6 is a plan view of an interdental cleaner according to a third embodiment of the invention.
Figures 7, 8:
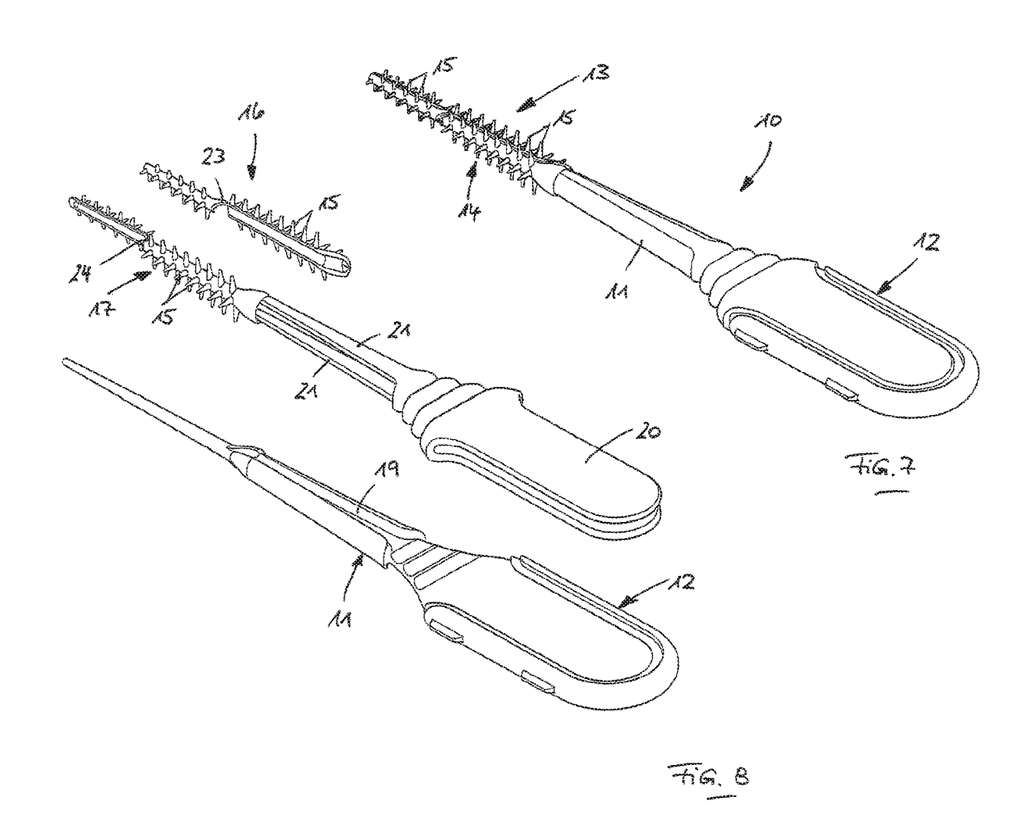
FIG. 7 is a perspective view of the interdental cleaner according to FIG. 6.
FIG. 8 is an exploded view of the components of the interdental cleaner according to FIG. 7.

FIGS. 6 to 8 show a development of the embodiment according to FIGS. 3 to 5. By contrast, it is provided here that the first cover part 16, in the front end region of the support 11, covers a longitudinal side of the support 11, on the left according to FIG. 7, and, in a region axially offset from the front end region of the support 11 in the direction of the handle part 12, covers the diametrically opposite longitudinal side of the support 11, on the right according to FIG. 7. The first cover part 16 thus consists of two partial-shell-shaped or half-shell-shaped portions which are interconnected via a web 23.

Accordingly, the second cover part 17 covers each of the longitudinal sides of the support 11 diametrically opposite the first cover part 16. According to FIGS. 6 to 8, the second cover part 17 has a front half shell which, in the front end region of the support 11, covers a longitudinal side of the support 11, on the right according to FIG. 7, and has another half shell which, in the region axially offset from the front end region in the direction of the handle part 12, covers the diametrically opposite longitudinal side of the support 11, on the left according to FIG. 7. The two partial-shell-shaped or half-shell-shaped regions of the second cover part 17 are also integrally interconnected via a web 24.

Figure 9:
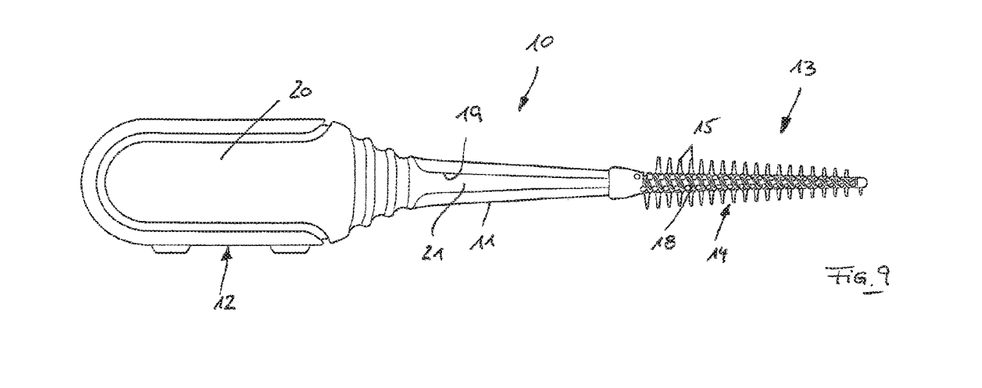
FIG. 9 is a plan view of an interdental cleaner according to a fourth embodiment of the invention.
Figures 10, 11:
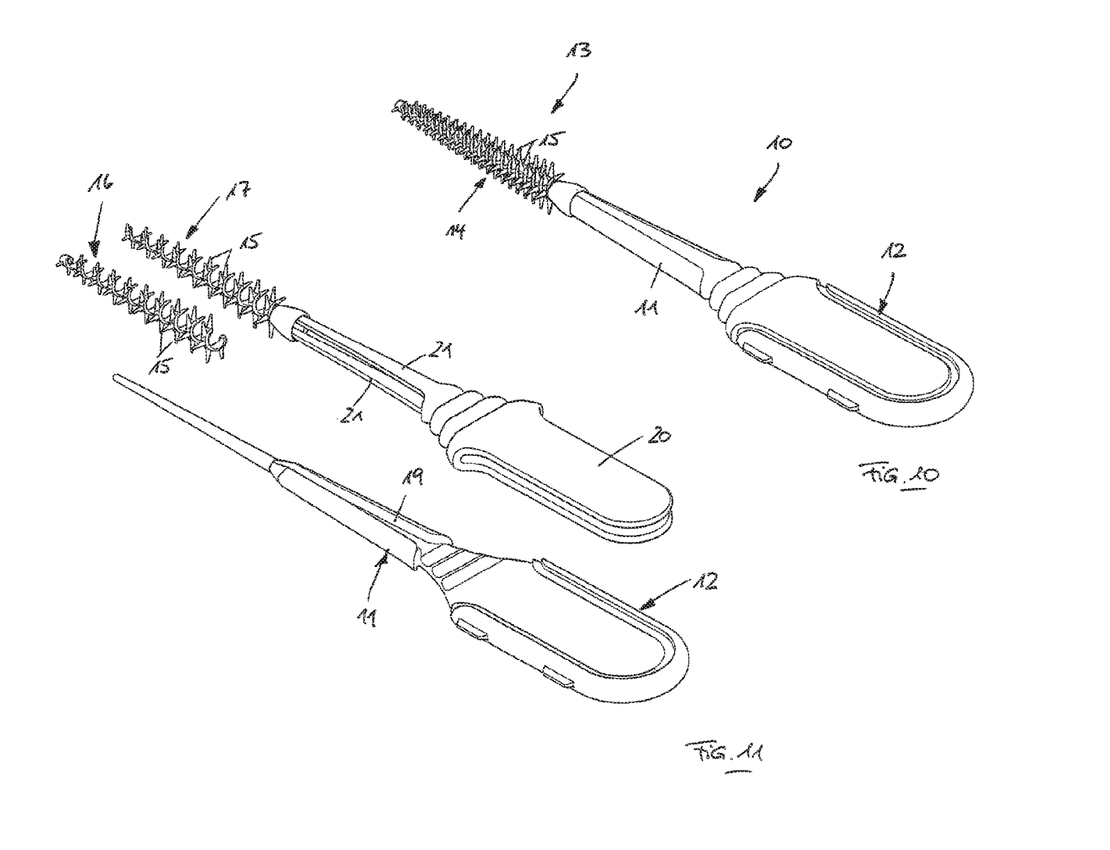
FIG. 10 is a perspective view of the interdental cleaner according to FIG. 9.
FIG. 11 is an exploded view of the components of the interdental cleaner according to FIG. 10.

FIGS. 9, 10 and 11 show an embodiment of the interdental cleaner 10 in which the two cover parts 16 and 17 are not arranged one behind the other in the axial direction or next to one another, but rather engage in one another. For this purpose, the first cover part 16 and the second cover part 17 are each designed as a helix extending around the support 11 (see FIG. 11), which have the same pitch but are offset on the support 11 by half a pitch in the axial direction and are thus combined to form the cover 14. There are therefore two congruent helices or spirals, which together form a double-thread screw. A groove 18 extending helically around the support may be provided between the two helices.

Figure 12:
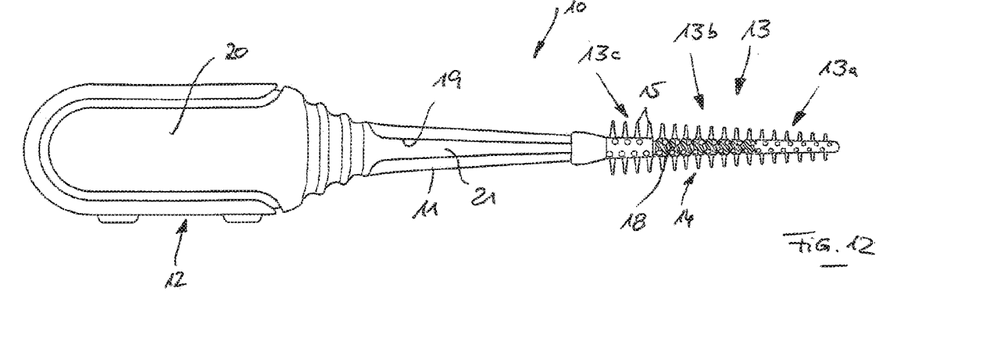
FIG. 12 is a plan view of an interdental cleaner according to a fifth embodiment of the invention.
Figures 13, 14:
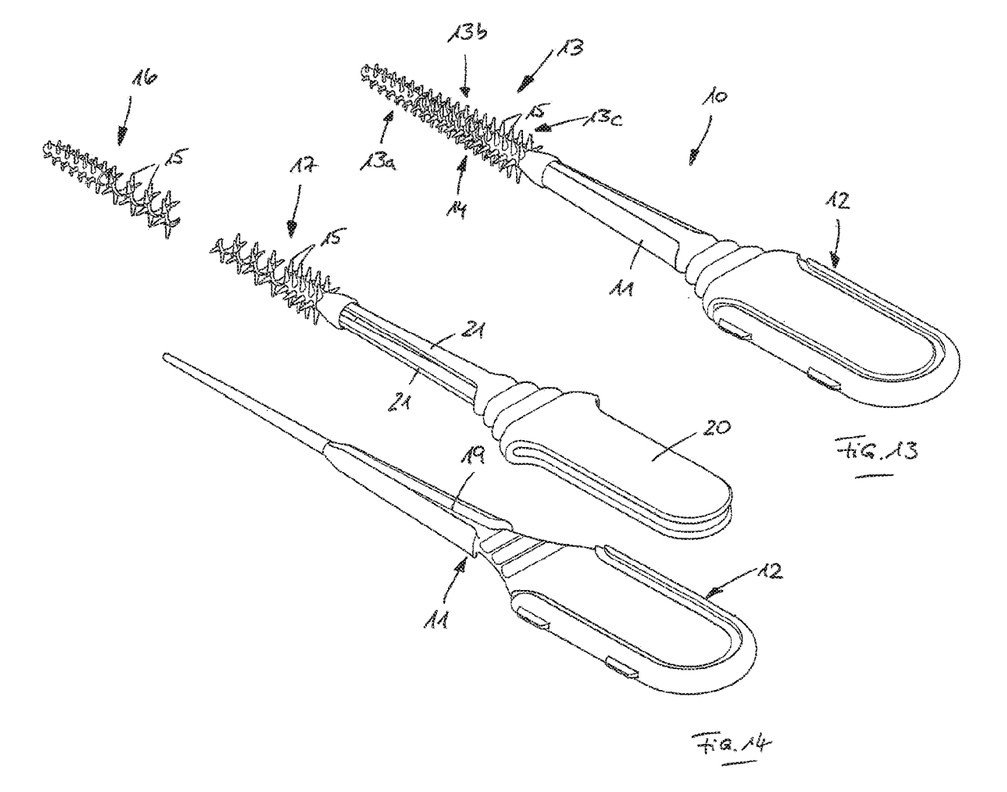
FIG. 13 is a perspective view of the interdental cleaner according to FIG. 12
FIG. 14 is an exploded view of the components of the interdental cleaner according to FIG. 13.

FIGS. 12 to 14 show an embodiment in which the cleaning part 13 has a plurality of cleaning-part portions 13a, 13b and 13c lying one behind the other in the axial direction of the support 11. The first cover part 16 has a front sleeve-shaped portion, which is followed by a helical portion in the direction of the handle part 12. The second cover part 16 has a tubular sleeve portion, which is followed by a helical portion in the direction of the front end of the support 11. When both cover parts 16 and 17 are fixed to the support (see FIG. 12), the sleeve-shaped front portion of the first cover part 16 forms the front cleaning-part portion 13a. The rear sleeve portion of the second cover part 17 forms the rear cleaning-part portion 13c. The central cleaning-part portion 13b is formed by the interaction of the two helical portions of the first cover part 16 and the second cover part 17, the two helical regions of the cover parts 16, 17 being combined so as to be offset by half a pitch of the helices in the above-mentioned manner.

The invention claimed is:

1. Interdental cleaner comprising a rod-shaped support made of plastics material, a handle part connected to the support, and a cleaning part which has a sleeve-shaped cover arranged on the support the cover supporting radially outwardly protruding cleaning elements, wherein the cover comprises a plurality of cover parts a first cover part comprising a first soft-elastic plastics material and a second cover part comprising a second soft-elastic plastics material or a thermoplastics material, the plastics material of the first cover part being different from the plastics material of the second cover part.

2. Interdental cleaner according to claim 1, wherein the plastics material of the first cover part and the plastics material of the second cover part have different Shore hardnesses.

3. Interdental cleaner according to claim 1, wherein the plastics material of the first cover part has a lower Shore hardness than the plastics material of the second cover part.

4. Interdental cleaner according to claim wherein a groove is formed between the first cover part and the second cover part.

5. Interdental cleaner according to claim 4, wherein the groove is filled with an additive.

6. Interdental cleaner according to claim 4, wherein the groove has a width in the range of from 0.05 mm to 1.0 mm.

7. Interdental cleaner according to claim 4, wherein the groove has a width in the range of from 0.1 mm to 0.5 mm.

8. Interdental cleaner according to claim 1, wherein the first cover part is arranged in a front end region of the support and in that the second cover part is arranged so as to be axially offset, relative thereto, on the support in a direction of the handle part.

9. Interdental cleaner according to claim 1, wherein the first cover part and the second cover part are each designed as a partial shell or half shell.

10. Interdental cleaner according to claim 9, wherein the first cover part covers a longitudinal side of an axial length of front portion of the support and the second cover part covers a diametrically opposite longitudinal side of the axial length of the front portion of the support.

11. Interdental cleaner according to claim 1, wherein the first cover part is arranged in a front end region of the support and covers a longitudinal side of the support and, in a region axially offset from the front end region in a direction of the handle part, covers a diametrically opposite longitudinal side of the support, and in that the second cover part covers the longitudinal sides of the support diametrically opposite the first cover part.

12. Interdental cleaner according to claim 1, wherein the first cover part (16) and the second cover part are each designed as a helix extending around the support.

13. Interdental cleaner according to claim 12, wherein the first and second cover parts are combined so as to be offset by half a pitch of the helix.

14. Interdental cleaner according to claim 1, wherein the cleaning part comprises a plurality of cleaning-part portions lying one behind each other in an axial direction of the support.

15. Interdental cleaner according to claim 14, wherein the plurality of a cleaning-part portions comprise a first cleaning-part portion, a second cleaning-part portion and a third cleaning-part portion, wherein the first cleaning-part portion is formed by the first cover part the second cleaning-part portion is formed by the first cover part and the second cover part, and the third cleaning-part portion is formed by the second cover part.

16. Interdental cleaner according to claim 15, wherein the second cleaning-part portion is formed in each case by a region of the first and second cover parts formed as helices extending around the support, the two helical regions of the first and second cover parts being combined so as to be offset by half a pitch of the helices.

* * * * *